United States Patent
Takano et al.

(10) Patent No.: US 8,332,640 B2
(45) Date of Patent: Dec. 11, 2012

(54) STORAGE APPARATUS, METHOD FOR VALIDATING ENCRYPTED CONTENT AND TERMINAL APPARATUS

(75) Inventors: Haruko Takano, Yokohama (JP);
Yukihide Inagaki, Fujisawa (JP);
Tatsuya Hirai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 970 days.

(21) Appl. No.: 12/331,563

(22) Filed: Dec. 10, 2008

(65) Prior Publication Data
US 2009/0177886 A1    Jul. 9, 2009

(30) Foreign Application Priority Data
Dec. 12, 2007 (JP) .................. 2007-321046

(51) Int. Cl.
*H04L 9/32* (2006.01)
*G06F 7/04* (2006.01)
*G06F 17/30* (2006.01)

(52) U.S. Cl. ............. 713/168; 726/2; 726/26; 726/28
(58) Field of Classification Search .............. None
See application file for complete search history.

(56) References Cited

U.S. PATENT DOCUMENTS

| | | | |
|---|---|---|---|
| 6,289,455 B1 * | 9/2001 | Kocher et al. | 713/194 |
| 6,957,350 B1 * | 10/2005 | Demos | 380/203 |
| 7,020,636 B2 * | 3/2006 | Ohmori et al. | 705/51 |
| 7,298,845 B2 * | 11/2007 | Tatebayashi et al. | 380/201 |
| 7,444,306 B2 * | 10/2008 | Varble | 705/52 |
| 2002/0013940 A1 * | 1/2002 | Tsukamoto et al. | 725/5 |
| 2004/0243488 A1 * | 12/2004 | Yamamoto et al. | 705/30 |
| 2005/0091681 A1 | 4/2005 | Borden et al. | |
| 2007/0248231 A1 | 10/2007 | Kasahara et al. | |

FOREIGN PATENT DOCUMENTS

| | | |
|---|---|---|
| EP | 1 770 577 | 4/2007 |
| JP | 11-283327 | 10/1999 |
| JP | 2002-042234 | 2/2002 |
| WO | WO 02/065750 | 8/2002 |
| WO | WO 2005/020540 | 3/2005 |

* cited by examiner

*Primary Examiner* — William Powers
(74) *Attorney, Agent, or Firm* — Antonelli, Terry, Stout & Kraus, LLP.

(57) ABSTRACT

A user can watch desired content among a plurality of encrypted contents recorded in a storage apparatus having a large capacity recording medium when the user wants to watch. Usage Pass (UP) necessary for watching content and encrypted content are recorded in a rental storage apparatus. The UP is in an invalid state when the storage apparatus is rented, and processing for validating the corresponding UP is executed between the storage apparatus and a host apparatus through which content is watched to thereby make content watchable. A history that processing for validating the UP is executed is recorded in the storage apparatus. A service provider bills a content use fee to the user based on the history of the storage apparatus.

6 Claims, 11 Drawing Sheets

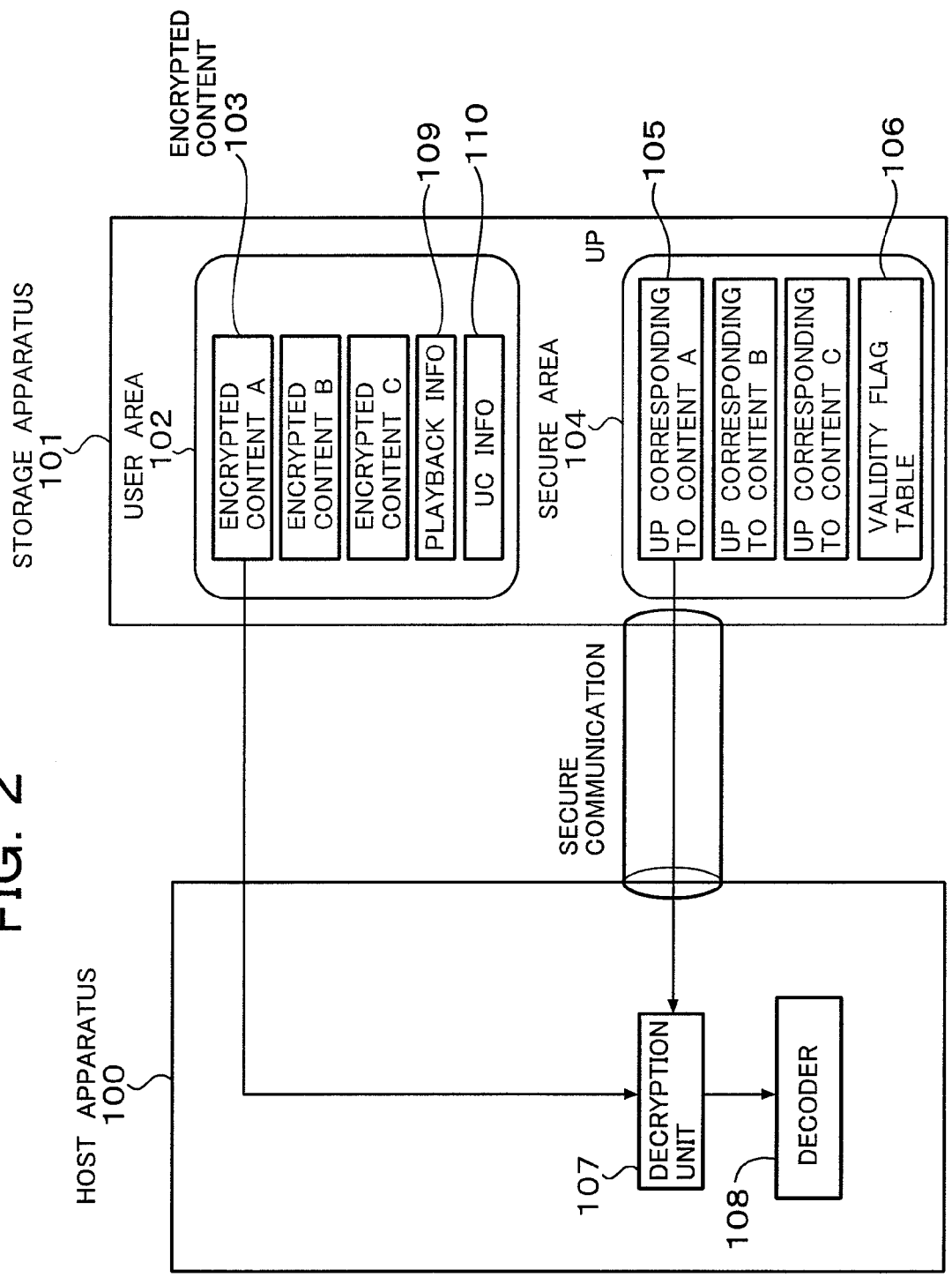

PLAYBACK INFO 109

| CONTENT ID (200) | UPID (201) |
|---|---|
| CONTENT A | UP-A |
| CONTENT B | UP-B |
| ... | ... |

UC INFO 110

| UPID 2 (201) | LBAQ (202) |
|---|---|
| UP-A | 00···01 |
| UP-B | 00···02 |
| ... | ... |

VALIDITY FLAG TABLE 106

| | | | | |
|---|---|---|---|---|
| 0 | 0 | ·· | 1 | 1 |
| 0 | 0 | ·· | 0 | 0 |
| 1 | 1 | 1 | 1 | 1 |
| ·· | ·· | ·· | ·· | ·· |

VALIDITY FLAG 203. UP RECORDED AT LBAQ CORRESPONDING TO THIS FLAG IS VALID

UP RECORDED AT LBAQ CORRESPONDING TO THIS FLAG IS INVALID

MEMBERSHIP CARD

NAME: XXX

USER ID: XXXXX

MANAGEMENT NUMBER: XXXXX

FIG. 6
600
ADDITIONAL CONTENT REGISTRATION
ENJOYABLE CONTENT 3 — 601
 ENJOYABLE CONTENT 4 — 602
 ENJOYABLE CONTENT 5 — 603
FIG. 7
700
USER AUTHENTICATION
USER ID : — 701
USER PW : — 702
MANAGEMENT NUMBER : — 703

FIG. 10

| ADDITIONAL CONTENT TO WATCH | |
|---|---|
| ENJOYABLE CONTENT 4 | 300 YEN |
| ENJOYABLE CONTENT 5 | 300 YEN |
| TOTAL | 600YEN |

FIG. 13

| ☑ LATEST MOVIE 1 | ☑ LATEST MOVIE 6 |
| ☐ LATEST MOVIE 2 | ☐ ... |
| ☐ LATEST MOVIE 3 | ☐ ... |
| ☐ LATEST MOVIE 4 | ☐ ... |
| ☑ LATEST MOVIE 5 | ☐ ... |

STORAGE APPARATUS, METHOD FOR VALIDATING ENCRYPTED CONTENT AND TERMINAL APPARATUS

BACKGROUND OF THE INVENTION

The present invention relates to a storage apparatus, a method for validating encrypted content and a terminal apparatus, and more particularly, to a method for validating encrypted content to make watching-restricted content watchable, a storage apparatus for storing encrypted content, and a terminal apparatus for watching encrypted content in a storage apparatus.

Recently, a digital information processing technology or a telecommunication technology rapidly develops, and a storage apparatuses such as a hard disc drive (HDD) and a digital video disc (DVD) are developing with a trend of a large capacity and high performance. As transmission means becomes diverse and advanced, a large quantity of digital contents are distributed to users through a network or a storage medium, and users can more easily enjoy digital contents. To the contrary, due to unauthorized uses of digital content such as an illegal copy or unauthorized modification, a copyright of a copyright holder is increasingly infringed.

In order to address the above problem, various technologies for protecting a copyright of a copyright holder while securing convenience of a user and a service or a system based on them have been introduced. For example, as a related art related to an on-line rental service of digital content, a technology disclosed in Patent Document 1 (Japanese Patent Laid-Open Publication No. 2002-42234) is known.

In Patent Document 1, a user registers information such as a user name or a credit card to a rental server, and when a rental request of content is received from a user terminal, a rental server performs user authentication and issues encrypted content and a decryption key (electronic ticket) for decrypting encrypted content, and a user watches encrypted content by using them. Also, in Patent Document 1, a user does not upload downloaded data in order to return content and instead returns the electronic ticket to the rental server.

In Patent Document 1, if the electronic ticket is returned, encrypted content stored in a user terminal can not be watched, and so it is possible to efficiently prevent unauthorized watching of content and an illegal copy of content.

As another related art, for example, a technology disclosed in Patent Document 2 (Japanese Patent Laid-Open Publication No. H11-283327) is known. In Patent Document 2, a service provider first distributes a DVD storing encrypted content to a user, and a user then purchases a license containing a content key for decrypting encrypted content from a license server to which a user has previously registered as a membership and decrypts encrypted content by using the key to watch it.

Also, Patent Document 2 suggests a service that a user first purchases points used to watch content, and points are then used to use and exchange content.

SUMMARY OF THE INVENTION

However, most of digital home appliances except a personal computer (PC) cannot access a network. For this reason, the above-mentioned related arts have a problem in that it is difficult to download content from the rental server via the network as described above in Patent Document 1 or to download a license a license server via the network as described above in Patent Document 2.

Patent Document 2 also suggests a technique that a reproducing terminal, a card adapter which can access a reproducing terminal and a pre-paid card in which content watching points previously purchased in a shop are recorded are prepared, and when a pre-paid card is inserted into a card adapter in order to watch encrypted content, points are deducted as much to thereby decrypt encrypted content.

However, in order to realize such a technique, a user has to purchase or rent a card adapter and a pre-paid card, and thus it hardly says that convenience of a user is improved compared to a current rental service.

It is an object of the present invention to provide, in consideration of the above-mentioned problems of the related arts, a method for validating content data, a storage apparatus and a terminal apparatus that a user can watch desired content among a plurality of encrypted copyright contents recorded in a storage apparatus having a large capacity storing medium at any time without accessing a network or needing a pre-paid card, and a use fee of watched content is billed to a user, thereby protecting a copyright of a copyright holder while improving convenience of a user.

In order to achieve the above object, the present invention provides a storage apparatus which is able to communicate with an external apparatus, including: a storing area for storing encrypted content that content is encrypted; a storing area for storing a key for decrypting the encrypted content; a storing area for storing state information of a key for decrypting the encrypted content; means for receiving authentication information from a first external apparatus which reproduces content; means for executing authentication processing based on the authentication information received from the first external apparatus; means for receiving location information of a key for decrypting the encrypted content from the first external apparatus; means for receiving a command for changing state information of a key for decrypting the encrypted content from the first external apparatus; means for executing a command for changing state information of the received key under a certain condition; means for recording a history that the command is executed in a storing area installed therein; means for receiving a command for outputting the history to a corresponding external apparatus from the first external apparatus or a second external apparatus; and means for executing a command for outputting the history when the command for outputting the history is received from the first or second external apparatus.

According to the present invention, a trouble that a user has to rent or purchase digital content is reduced, thereby improving user convenience.

BRIEF DESCRIPTION OF THE DRAWINGS

These and other features, objects and advantages of the present invention will become more apparent from the following description when taken in conjunction with the accompanying drawings wherein:

FIG. 2 is a view illustrating schematically a system according to the exemplary embodiment of the present invention;

FIG. 6 is a view illustrating an example of a content selecting screen displayed on a display if a certificate is a rental certificate and it is possible to perform validation of UP in processing described above with reference to FIG. 5;

FIG. 7 is a view illustrating an example of a user authentication screen displayed for a user authentication performed in UP validation processing of step 506 described above with reference to FIG. 5;

FIG. 10 is a view illustrating an example that a billing fee computed in processing of FIG. 9 is displayed on a display of a host apparatus in a rental shop;

FIG. 13 is a view illustrating an example of a screen that a user selects content desired to watch in an automatic rental machine to which the exemplary embodiment of the present invention is applied.

DESCRIPTION OF THE EMBODIMENTS

Figure 1:
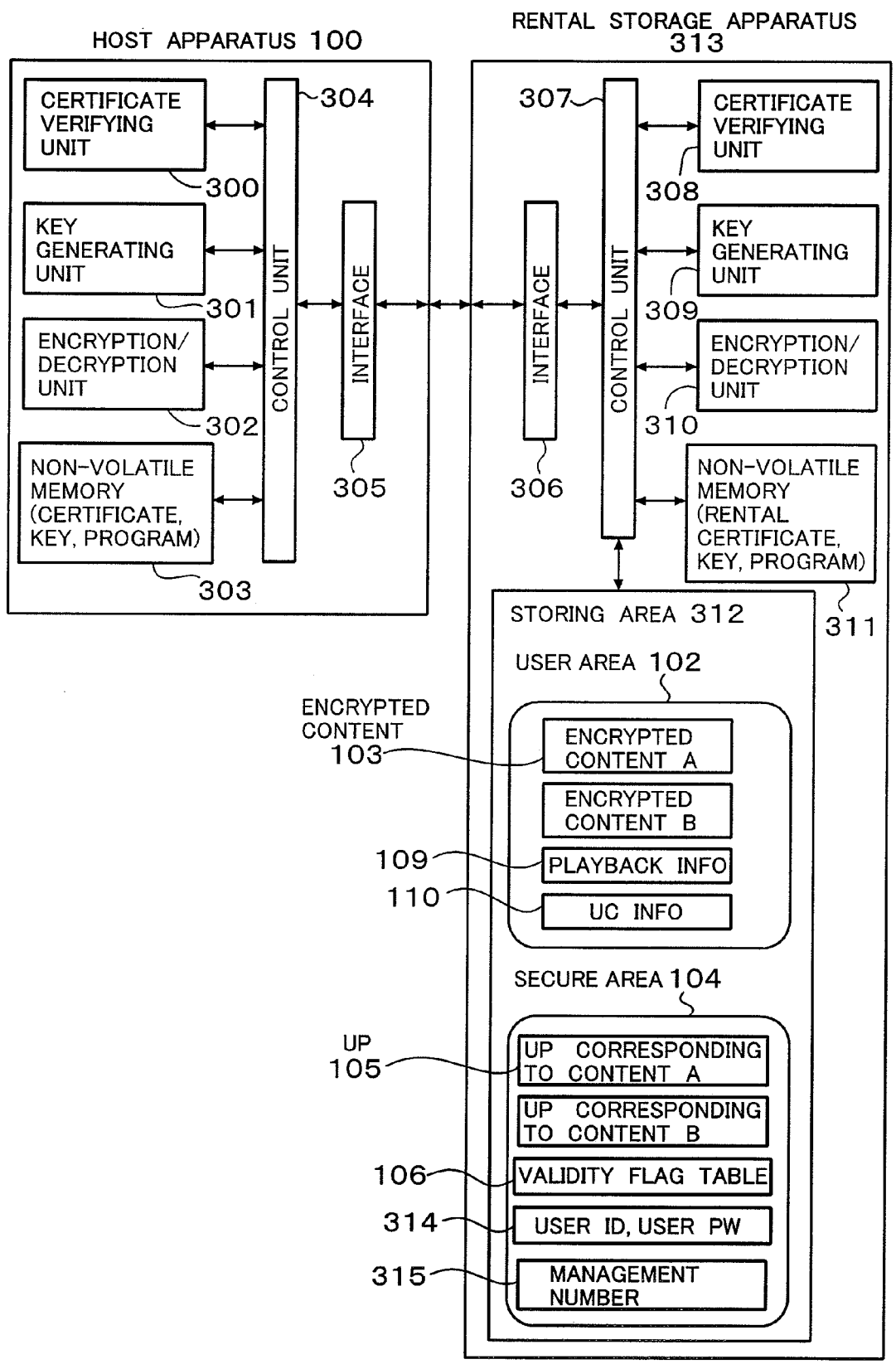
FIG. 1 is a block diagram illustrating a content rental system according to an exemplary embodiment of the present invention.

Hereinafter, a method for validating content data, a storage apparatus and a terminal apparatus according to an exemplary embodiment of the present invention will be described in detail with reference to attached drawings.

FIG. 2 is a view illustrating schematically a system according to the exemplary embodiment of the present invention. The system of FIG. 2 according to the exemplary embodiment of the present invention includes a host apparatus 100 as a terminal apparatus which decrypts and displays encrypted content according to the exemplary embodiment of the present invention and a storage apparatus 101 according to the exemplary embodiment of the present invention.

The storage apparatus 101 in which content is recorded includes a user area 102 that there is no access restriction and a secure area 104 that there is an access restriction. Content is encrypted by using a content key in a common key encryption manner to be converted into an encrypted content 103 and is recorded in the user area 102. Usage pass (hereinafter, UP) 105 containing a content key for decrypting the encrypted content 103 or a content usage condition is recorded in the secure area 104. UP is dealt as secure to protect content.

As information for making the encrypted content 103 and the UP 105 correspond to each other, playback info 109 and UC info 110 are created in the user area 102 of the storage apparatus 101, and as information for managing a state of the UP, validity flag table 106 is created in the secure area 104 of the storage apparatus 101.

Figures 3A, 3B, 3C, 4:
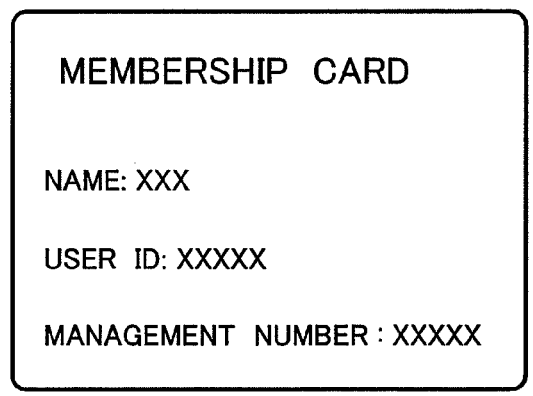
FIGS. 3A to 3C are views illustrating structures of playback info, UC info, and validity flag table.
FIG. 4 shows a configuration of a membership card.

FIGS. 3A to 3C are views illustrating structures of the playback info 109, the UC info 110, and the validity flag table 106.

The playback info 109 is a table which manages a correspondence relationship between content identifier (hereinafter, content ID) 200 attached to encrypted content and UP identifier (hereinafter, UPID) 201 attached to the UP corresponding to encrypted content as shown in FIG. 3A.

The UC info 110 is a table which manages a correspondence relationship between the UPID 201 and recording address information (hereinafter, LBAQ) 202 in the secure area of the UP corresponding to the UPID 201 as shown in FIG. 3B.

The validity flag table 106 is a table including bit (hereinafter, validity flag) 203 which 1:1 corresponds to the recording address LBAQ 202 of the UP as shown in FIG. 3C and indicates a state of the UP recorded in the corresponding LBAQ by using a value of the validity flag 203. In the exemplary embodiment of the present invention, a bit value "0" indicates that the UP is valid, and a bit value "1" indicates that the UP is invalid. A correspondence relationship between a validity flag and the LBAQ can be made such that a location of a validity flag bit within the validity flag table 106 and a recording location of the LBAQ 202 within the UC info 110 correspond to each other.

The host apparatus 100 includes a decryption unit 107 and a decoder 108 as shown in FIG. 2 and performs mutual authentication and key sharing processing with the storage apparatus 101 in the beginning if having access to the storage apparatus 101. A detailed procedure of this processing will be described later with reference to FIG. 11.

After authentication success, the host apparatus 100 acquires the encrypted content 103, the playback info 109, and the UC info 110 from the user area 102 of the storage apparatus 101 having access thereto in order to reproduce content. The host apparatus 100 acquires the LBAQ of the secure area 104 within the storage apparatus 101 in which the UP 105 corresponding to the acquired encrypted content 103 is recorded based on the acquired playback info 109 and the acquired UC info 110, and instructs the storage apparatus 101 to output the UP recorded at the acquired LBAQ.

The storage apparatus 101 receives a command described above and checks whether the UP recorded at the LBAQ is valid or not with reference to a validity flag value corresponding to the LBAQ in the validity flag table 106 within the secure area 104 of the storage apparatus. If the UP is valid, the storage apparatus 101 outputs the UP to the host apparatus 100. A UP transmission from the storage apparatus 101 to the host apparatus 100 is performed in a special secure protocol to prevent modification or tapping. A detailed UP transmission procedure will be described later with reference to FIG. 12.

Even when the content is moved to a storage apparatus such as HDD installed inside or connected to the host apparatus 100, in the same procedure as the content reproducing procedure described above, the encrypted content 103, the playback info 109, the UC info 110, and the UP 105 are transmitted to the storage apparatus installed inside or connected to the host apparatus 100 through the host apparatus 100 from the storage apparatus 101. The storage apparatus 101 as a UP output resource outputs the UP and, at the same time, changes a validity flag value corresponding to the corresponding UP in the validity flag table 106 to "1" to invalidate the corresponding UP. If the storage apparatus 101 changes a validity flag value in the validity flag table 106 to "1" so that the UP becomes an invalid state, the host apparatus 100 cannot read the corresponding UP.

FIG. 1 is a block diagram illustrating a content rental system according to the exemplary embodiment of the present invention.

The content rental system of FIG. 1 according to the exemplary embodiment of the present invention includes the host apparatus 100 as a terminal apparatus according to the exemplary embodiment of the present invention and a rental storage apparatus 313 according to the exemplary embodiment of the present invention.

For example, a television (TV), a set top box (STB), a personal computer (PC), a mobile player, or an automatic content rental machine may be used as the host apparatus 100. The host apparatus 100 includes, as its components, an interface 305, a control unit 304 for controlling various functions, a key generating unit 301 for generating a provisional key necessary for a communication, an encryption/decryption unit 302 for executing encryption/decryption of data, a certificate verifying unit 300 for performing certificate verification, and a non-volatile memory 303 in which a certificate of the host apparatus 100, a device class public key, a device class secret key, a device public key, a device secret key, a program, and the like are recorded. Such functions are mounted in a tamper resistant manner. A tamper resistant mounting can be realized such that a top side of a circuit is covered with plastic resin to prevent a signal from being read out externally through an internal-external interface.

The rental storage apparatus 313 is a portable HDD in which a content protection function is mounted like an information versatile disk for removable (iVDR) drive. The rental storage apparatus 313 includes, as its components, an interface 306, a control unit 307 including a central processing unit (CPU) for controlling various functions, a key generating unit 309 for generating a provisional key necessary for a communication, an encryption/decryption unit 310 for executing encryption/decryption of data, a certificate verifying unit 308 for performing certificate verification, and a non-volatile memory 311 in which a certificate of an reproducing apparatus, a device class public key, a device class secret key, a device public key, a device secret key, a program, and the like are recorded. Such functions are mounted in a tamper resistant manner. A tamper resistant mounting may be performed in the above-described manner.

The rental storage apparatus 313 further includes a storage area 312 in which various data are recorded. The memory area 312 of the rental storage apparatus 313 is logically divided into at least two areas. As the two areas, one is the user area 102 that there is no access restriction, and the other is the secure area 104 that access is allowed under a certain condition as shown in FIG. 2.

In FIG. 1, a plurality of encrypted contents 103, the playback info 109, the UC info 110 are recorded in user area 312 of the rental storage apparatus 313 which is rented in a rental shop, and the UP 105 corresponding to encrypted content stored in the user area 312 and the validity flag table 106 are recorded in the secure area 104. Here, when the rental storage apparatus 313 is rented, all of validity flag values in the validity flag table 106 are "1", and the UP is in an invalid state. A rental certificate dedicated to the rental storage apparatus 313 is recorded in the non-volatile memory 311 of the rental storage apparatus 313. A rental certificate is based on, for example, the international telecommunication union-telecommunication (ITU-T) X.509, and a value of a serial number of a certificate is used as a predetermined rental value to be discriminated from other certificates.

A user ID, a user password (PW) 314, and a management number 315 are recorded in the secure area 104 of the rental storage apparatus 313 by using a dedicated terminal installed in a rental shop when the rental storage apparatus 313 is rent to a user. Here, the user ID and the user PW 314 are information provided from a service provider when the user applies for a rental service. A management number 315 is a number which is printed on a membership card as shown in FIG. 4 or is attached to the rental storage apparatus when the rental storage apparatus 313 is rented.

FIG. 4 shows a configuration of a membership card. The membership card is issued to a user from a rental shop, and at least a user name, the user ID information, and a management number are recorded on the membership card as shown in FIG. 4. The management number is a management number used when a rental storage apparatus is rented and is not necessary if a number attached to the rental storage apparatus is used as the management number. A user PW is assigned to the user when the membership card is issued.

Figure 5:
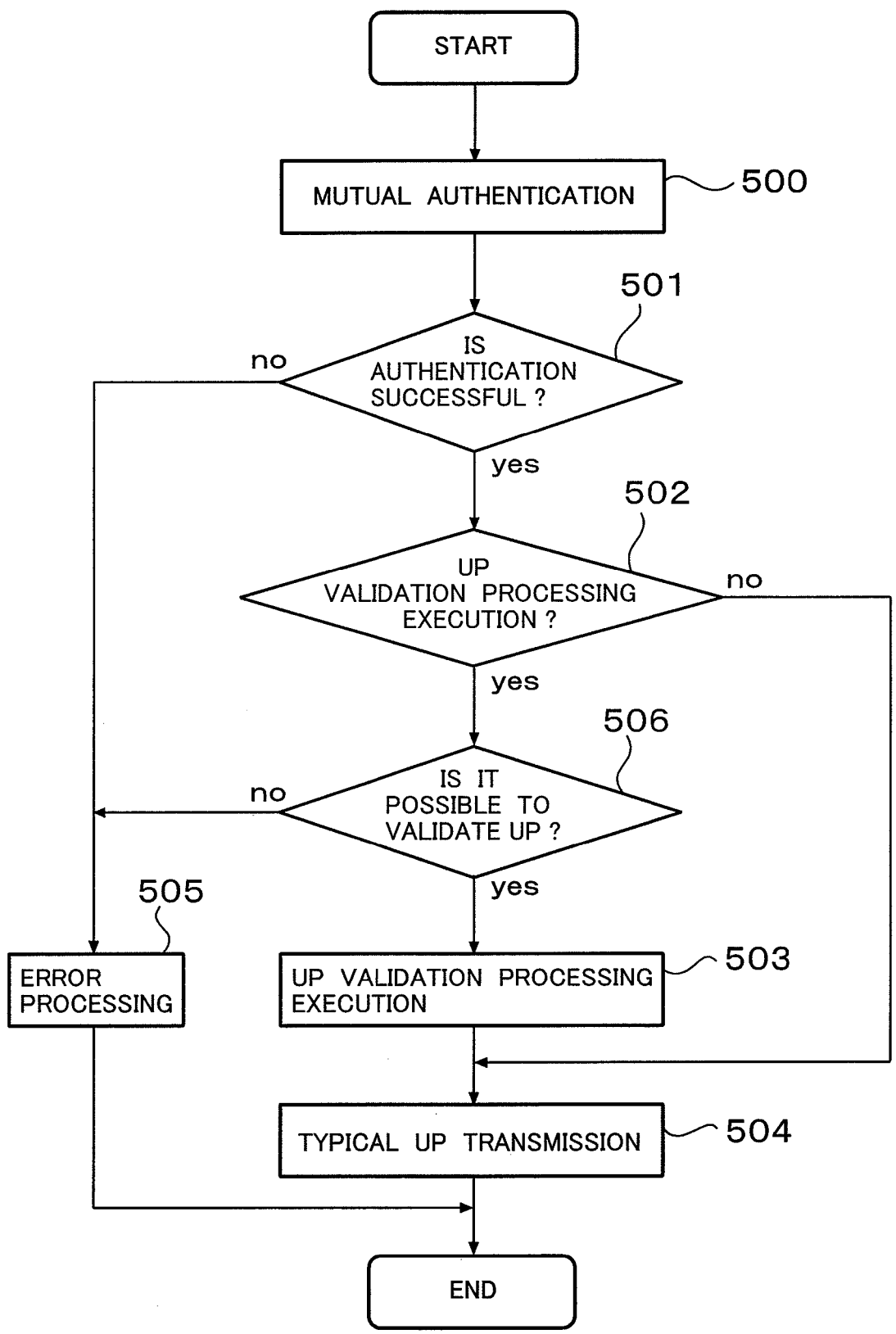
FIG. 5 is a flowchart illustrating a processing operation performed in a host apparatus when a rental storage apparatus accesses the host apparatus.

FIG. 5 is a flowchart illustrating a processing operation performed in the host apparatus when the rental storage apparatus 313 accesses the host apparatus 100, which will be described below.

(1) If a user makes the rental storage apparatus 313 access the host apparatus 100 such as, for example, a television, the host apparatus 100 and the rental storage apparatus 313 perform a mutual authentication according to a procedure which will be described later with reference to FIG. 11, determines whether the mutual authentication is successful or not, performs error processing if it fails, and then processing is finished (steps 500, 501 and 505).

(2) If it is determined in step 501 that a mutual authentication is successful, the user is queried whether to perform validation of the UP to make watching-restricted content watchable or not. If validation of the UP is performed to make watching-restricted content watchable, the host apparatus 100 checks whether a certificate acquired from the rental storage apparatus is a rental certificate or not and checks whether it is possible to perform validation of the UP to make watching-restricted content watchable or not (steps 502 and 506).

(3) If it is determined in step 506 that a certificate acquired from the rental storage apparatus is a rental certificate and it is possible to perform validation of the UP to make watching-restricted content watchable, validation processing of the UP is executed (step 503).

(4) If it is determined in step 506 that a certificate acquired from the rental storage apparatus is not a rental certificate and it is impossible to perform validation of the UP to make watching-restricted content watchable, since validation processing of the UP cannot be executed, error processing is performed, and then processing is finished (step 505).

(5) If it is determined in step 502 that validation of the UP will not be performed, since it is assumed that already the validated UP exists, the host apparatus acquires already the validated UP from the rental storage apparatus 313 according to a UP transmission procedure which will be described later with reference to FIG. 12. The host apparatus acquires the UP validated by validation processing of the UP in step 503 from the rental storage apparatus 313. The host apparatus decrypts encrypted content using the UP acquired from the rental storage apparatus (step 504).

FIG. 6 is a view illustrating an example of a content selecting screen displayed on a display if a certificate is a rental certificate and it is possible to perform validation of the UP in processing described above with reference to FIG. 5.

If a mutual authentication is determined as successful in step 501 and a certificate received from the storage apparatus is determined as a rental certificate in step 502, the host apparatus 100 displays screen 600 for selecting content on its display as shown in FIG. 6. In screen 600, content 601 having no check box is watchable content, and contents 602 and 603 having a check box are contents which can be watched by an operation described below. In the exemplary embodiment of the present invention, since the rental storage apparatus 313 is rented after the UP is invalidated, content which is watchable in this sate is content which is recorded in a plain-text state, for example, content which does not need protection or content which does not need the UP when content is watched. The user selects desired content by using a button installed on a remote controller, a display or the host apparatus. In the drawing, an enjoyable content 4 is selected.

FIG. 7 is a view illustrating an example of a user authentication screen displayed for a user authentication performed in the UP validation processing of step 506 described above with reference to FIG. 5.

The host apparatus 100 displays user authentication screen 700 for a user authentication as shown in FIG. 7. In this user authentication screen, a user is asked to an input user ID 701, a user PW 702, and a management number 703. The user input necessary information to a screen by using a button installed in the remote controller or the host apparatus. The user ID 701 and the user PW 702 are inputted for a user verification, and the management number 703 is inputted to check whether processing is executed by a user's intention or not.

Figure 8:
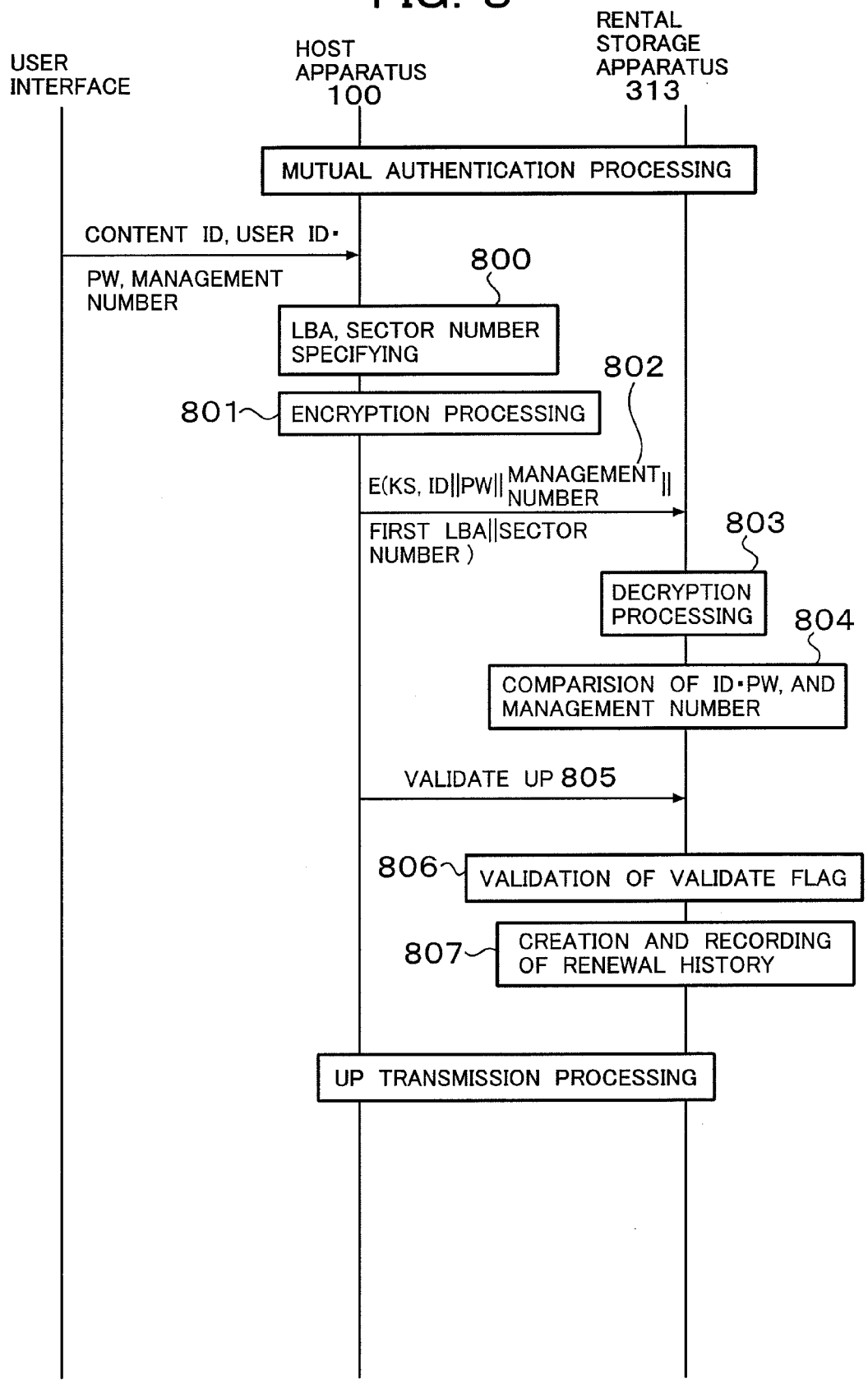
FIG. 8 is a flowchart illustrating UP validation processing of step 503 described in the flowchart of FIG. 5.

FIG. 8 is a flowchart illustrating UP validation processing of step 503 described in the flowchart of FIG. 5, which will be described below.

(1) After mutual authentication processing which will be described later is performed between the host apparatus 100 and the rental storage apparatus 313, the content ID, the user ID, the PW, and the management number are inputted by the user, and so the host apparatus 100 specifies the LBAQ at which the UP corresponding to the content ID inputted by the user is recorded and the sector number continued thereto based on the playback info 109 and the UC info 110 acquired from the rental storage apparatus 313 (step 800).

(2) Then, the host apparatus 100 encrypts the user ID 701, the user PW 702, the management number 703, the ID 602 of content desired to watch, the LBAQ, and a sector number continued thereto in a common key encryption manner by using a provisional key 1118, which will be described later, shared with the rental storage apparatus 313 during the mutual authentication, and transmits the data:

E(Ks, ID|PW|management number|first LBA|sector number)

to the rental storage apparatus 313. In the exemplary embodiment of the present invention, it is premised that one UP is recorded with respect to one sector, and if one encrypted content corresponds to a plurality of UPs, the recording address LBAQ of a plurality of UPs are continued (steps 801 and 802).

(3) The rental storage apparatus 313 decrypts encrypted data received in processing of step 802 using the provisional key 1118 shared with the host apparatus 100 during the mutual authentication, and the compares user ID 701, the user PW 702 and the management number information 703 which are acquired to the user ID, the user PW 314 and the management number 315 which are recorded therein using a dedicated terminal of the rental shape when rented to thereby determine whether they are identical or not (steps 803 and 804).

(4) If it is confirmed in the rental storage apparatus 313 that decryption processing of step 803 and a comparison of the user IDs, the user PWs and the management numbers in step 804 are successful, the host apparatus 100 issues a command Validate UP for validating the UP to the rental storage apparatus 313 (step 805).

(5) If the command Validate UP is received, the rental storage apparatus 313 first changes a validity flag of a validity flag table corresponding to the LBAQ received from the host apparatus 100 to a valid value. As a history that validation processing of the validity flag is executed, a UPID of the validated UP is recorded in a history storing area (not shown in the drawing), for example, which is only accessible from the storage apparatus system in the storage apparatus. In this history storing area, a read operation by a special external command is allowed, but a writing operation is not allowed (steps 806 and 807).

The host apparatus 100 reads out the UP validated by above-described processing from the rental storage apparatus 313 according a UP transmission protocol which will be described later with reference to FIG. 12, decrypts encrypted content corresponding to the UP and performs reproduction processing.

Figure 9:
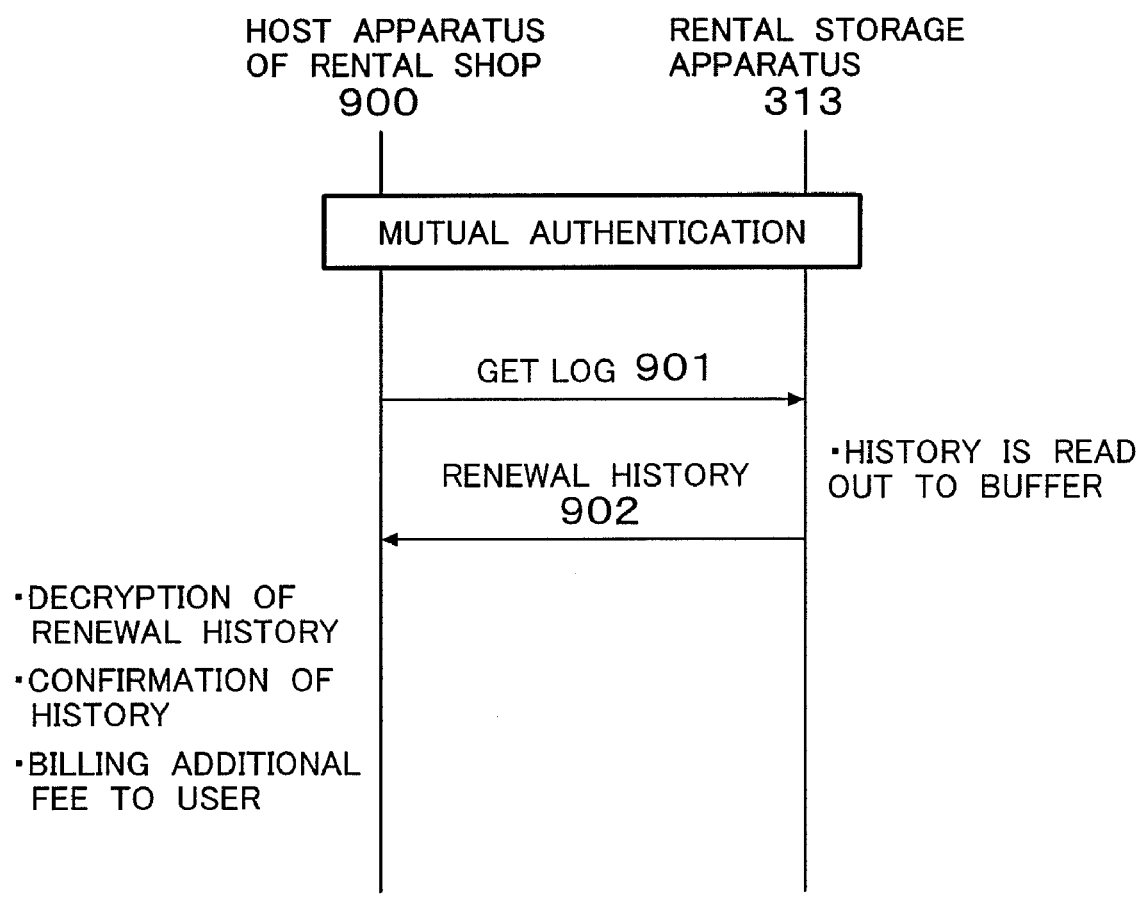
FIG. 9 is a flowchart illustrating a processing operation when the rental storage apparatus is returned.

FIG. 9 is a flowchart illustrating a processing operation when the rental storage apparatus 313 is returned, which will be described below.

(1) If the user returns the rental storage apparatus 313 to the rental shop, a clerk makes the rental storage apparatus 313 access a host apparatus 900 in the rental shop. The host apparatus 900 in the rental shop and the rental storage apparatus 313 perform a mutual authentication, and then the host apparatus issues command Get Log 901 for acquiring a recording history to the rental storage apparatus 313 (step 901)

(2) If the command is received, the rental storage apparatus 313 extracts a history from a history storing area and outputs it to the host apparatus 900, and the host apparatus 900 computes a name of content watched by the user and a use fee based on received history information (step 902).

In above-described processing, the host apparatus 900 in the rental shop acquires the history stored in the rental storage apparatus 313, but the user who rented the storage apparatus 313 occasionally wants to know a watching history. In this instance, same processing as described above can be performed between the host apparatus 100 through which the user watches content and the rental storage apparatus 313 so that the user can be informed of the watching history.

FIG. 10 is a view illustrating an example that a billing fee computed in processing of FIG. 9 is displayed on a display of the host apparatus 900 in the rental shop. The rental shop clerk bills a use fee of watched content to the user according to a display shown in FIG. 10.

Figure 11:
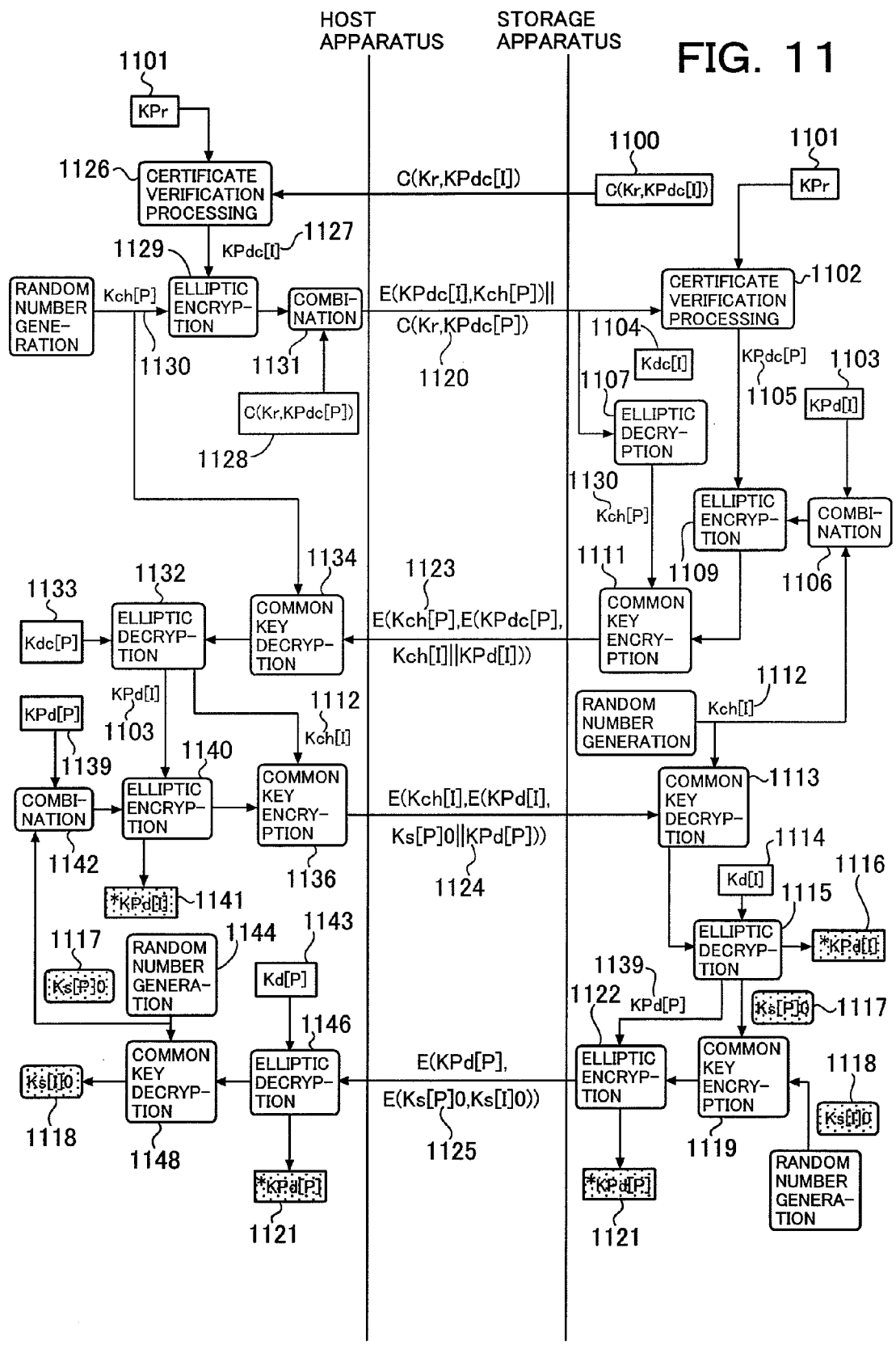
FIG. 11 is a flowchart illustrating processing procedures of a mutual authentication and a key sharing between the host apparatus and the storage apparatus.

FIG. 11 is a flowchart illustrating processing procedures of a mutual authentication and a key sharing between the host apparatus and the storage apparatus, which will be described below.

As a premise for executing a flow described with reference to FIG. 11, a device class public key KPdc of the host apparatus, a device class secrete key Kdc, a device individual public key KPd, a device individual secrete key Kd, and a device class public key certificate C (Kr, KPdc [P]) for representing validity of a device class public key stored in the host apparatus are registered in the host apparatus in advance. Similarly, a device class public key KPdc of the storage apparatus, a device class secrete key Kdc, a device individual public key KPd, a device individual secrete key Kd, and a device class public key certificate C(Kr, KPdc [I]) for representing validity of a device class public key stored in the storage apparatus are registered in the storage apparatus in advance.

(1) If the storage apparatus which is storing the UP accesses the host apparatus, the storage apparatus transmits a device class public key certificate C(Kr, KPdc [I]) 1100 stored therein to the host apparatus. The host apparatus verifies the certificate by using a root public key KPr 1101 stored therein (step 1126).

(2) The host apparatus can acquire a device class public key KPdc [I] 1127 stored in the storage apparatus if a verification is successful and generates a challenge key Kch [P] 1130 by using a random number generator after a verification is finished. The challenge key Kch [P] 1130 is encrypted by an elliptic cryptography by using the device class public key 1127 acquired by verification processing of a certificate, and then a device class public key certificate C(Kr, KPdc [P]) 1128 stored therein is combined with encrypted data (steps 1129 and 1131).

(3) Then, the host apparatus transmits combined data E (KPdc [I], Kch [P]|C(Kr, KPdc [P]) 1120 to the storage apparatus.

(4) The storage apparatus divides received data 1120 into the device class public key certificate 1128 of the host apparatus and encrypted data, and verifies the device class public key certificate 1128 by using the root public key KPr 1101 stored therein. If verification is successful, the storage apparatus can acquires a device class public key KPdc [P] 1105 stored in the host apparatus (step 1102).

(5) The storage apparatus decrypts divided encrypted data by using a device class secrete key Kdc [I] 1104 stored therein. As a result of decryption, the storage apparatus can acquire the challenge key Kch [P] 1130 generated in the above procedure by the host apparatus (step 1107).

(6) Next, the storage apparatus generates a challenge key Kch [I] 1112 by using a random number generator and transmits data that combined data is dual-encrypted by using the device class public key KPdc [P] 1105 and the challenge key Kch [P] 1130 which are acquired in above processing E(Kch [P], E(KPdc [P], Kch [I]|Kpd [I])) 1123 to the host apparatus (steps 1106, 1109, and 1111).

(7) The host apparatus decrypts received data 1123 by using the challenge key Kch [P] 1130 generated a moment ago. The host apparatus also performs decryption by using a device class secrete key Kdc [P] 1133 previously stored therein. As a result, the host apparatus can acquire the device public key KPd [I] 1103 of the storage apparatus and the challenge key Kch [I] 1112 generated by the storage apparatus (steps 1134 and 1132).

(8) Then, the host apparatus generates a session key Ks [P] 0 1117 by using a random number generator 1144, combines the session key 1117 with a device public key KPd [P] 1139 previously stored therein, encrypts combined data by using the device public key KPd [P] 1103 of the storage apparatus acquired in above processing, and a creates shared key KPd [I] 1141 by using an Elliptic Curve Diffie-Hellman (ECDH) key exchange algorithm (steps 1142 and 1140).

(9) The host apparatus also encrypts data encrypted in processing of step 1140 by using the challenge key Kch [I] 1112 acquired in above processing, and transmits encrypted data E(Kch [I], E(KPd [I], Ks [P] 0|KPd [P])) 1124 to the storage apparatus (step 1136).

(10) The storage apparatus receives encrypted data 1124 and decrypts received encrypted data 1124 by using the previously generated challenge key Kch [I] 1112 and a device secrete key Kd [I] 1114 previously stored therein. As a result, the storage apparatus can acquire the session key Ks [P] 0 1117 and the device public key KPd [P] 1139 stored in the host apparatus. Also, a shared key *KPd [I] 1116 is created by using an ECDH key exchange algorithm during execution of elliptic decryption processing (step S1113 and 1115).

(11) After completing above-described processing, the storage apparatus creates a session key Ks [I] 0 1118 by using the random number generator, encrypts the created session key 1118 by using the session key Ks [P] 0 1117 which is created by the host apparatus and acquired in above processing, and also encrypts it by using the device public key KPd [P] 1139 of the host apparatus. Also, a shared key *KPd [P] 1121 is created by using an ECDH key exchange algorithm. Encrypted data E(KPd [P], E(Ks [P] 0, Ks [I] 0)) 1125 is transmitted to the host apparatus (steps 1119 and 1122).

(12) The host apparatus receives encrypted data 1125 and decrypts encrypted data 1125 by using the device secrete key KPd [P] 1143 stored therein and the session key Ks [P] 0 1117 previously generated. As a result, a session key Ks [I] 0 1118 created in the storage apparatus can be acquired. At this time, the shared key *KPd [P] 1121 can be also acquired by using an ECDH key exchange algorithm (steps 1146 and 1148).

Accordingly, the host apparatus and the storage apparatus can share the session key 1117, the session key 1118, the ECDH shared key 1121, and the ECDH shared key 1116 by the above-described procedures.

Figure 12:
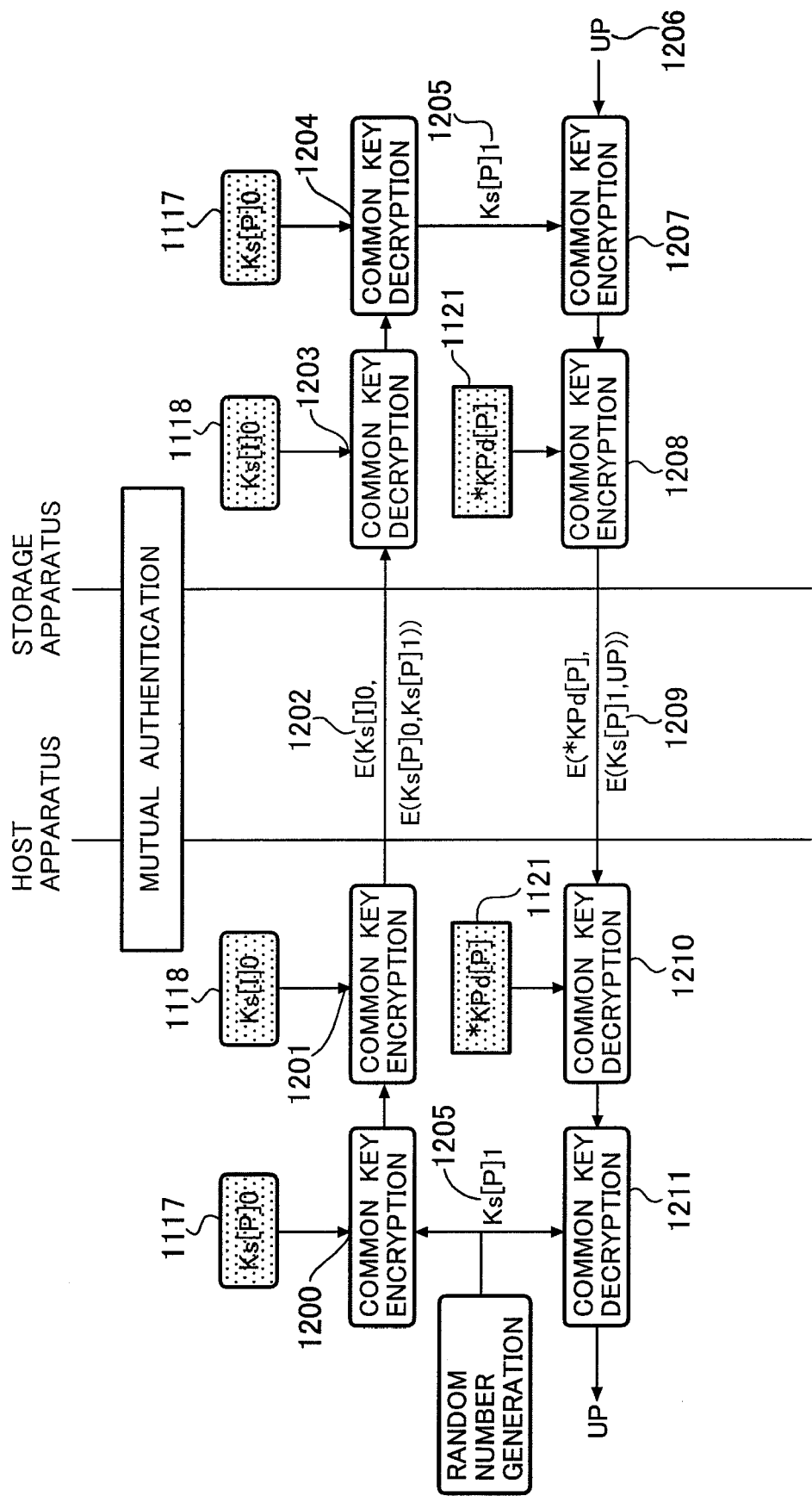
FIG. 12 is a flowchart illustrating a transmission procedure when the storage apparatus transmits UP to the host apparatus.

FIG. 12 is a flowchart illustrating a transmission procedure when the storage apparatus transmits the UP to the host apparatus, which will be described below. This processing describes processing of step 504 of the flow shown in FIG. 5 in detail.

(1) The host apparatus creates a second session key Ks [P] 1 1205 using the random number generator. The second session key 1205 is encrypted using the session key Ks [P] 0 1117 and the session key Ks [I] 0 1118 which are shared in the mutual authentication and key sharing procedure. Encrypted data E(Ks [I] 0, E(Ks [P] 0, Ks [P] 1)) 1202 is transmitted to the storage apparatus (step 1200 and 1201).

(2) The storage apparatus receives encrypted data 1202 described above and decrypts received encrypted data 1202 using the session key Ks [P] 0 1117 and the session key Ks [I] 0 1118 which are shared in above processing to acquire the second session key 1205 created in the host apparatus (steps 1203 and 1204).

(3) Next, the storage apparatus transmits data that the UP is encrypted using the second session key Ks [P] 1 1205 and the ECDH shared key *KPd [P] 1121 shared in above processing E(*KPd [P], E(Ks [P] 1, UP)) 1209 to the host apparatus (steps 1207 and 1208).

(4) The host apparatus decrypts received encrypted data 1209 using the ECDH shared key 1121 and the second session key Ks [P] 1 1205 created in above processing to acquire the UP (step 1210 and 1211).

In the exemplary embodiment of the present invention described above, the user ID 701, the user PW 702, the management number 703, the ID 602 of content desired to watch, the LBA Q, and the sector number continued thereto may be encrypted by a common key encryption method using a provision key shared with the rental storage apparatus 313 during a mutual authentication, and a command for outputting to the rental storage apparatus 313 may be combined with a command Validate UP for validating the UP as a single command.

Respective processing of the exemplary embodiment of the present invention described above may be implemented by a program and be executed by the CPU of the controller according to the exemplary embodiment. Such a program may be provided in a form that is stored in a recording medium such as a FD, a CD-ROM, and a DVD or may be provided in a digital information form via a network.

Also, in the exemplary embodiment of the present invention described above, the management number inputted by the user when validation of the UP is executed may be acquired through an internet or by querying to a shop via a telephone. Also, in the exemplary embodiment of the present invention described above, the management number is set for each storage apparatus, but the management number may be set for each content.

Also, in the exemplary embodiment of the present invention described above, the UPID is used as a history when the UP is validated, but the content ID may be used as a history. Also, in the exemplary embodiment of the present invention described above, the history is recorded in an area which only the storage apparatus system of the storage apparatus can access, but the history may be recorded in the user area of the storage apparatus after encrypting it using the key previously shared with the terminal of the shop.

Also, in the exemplary embodiment of the present invention described above, all UPs are invalidated when the storage apparatus is rented, but the following method can be applied.

A series of encrypted contents and the UP accompanied thereto are recorded in one storage apparatus. In the validity flag table, the UP is in an invalid state.

For example, if the user rents episodes 1 to 3 of contents from the shop, the shop validates the UPs of episodes 1 to 3 before renting them to the user. Since this processing can be performed by reversing the validity flag of the corresponding UP, a time can be saved compared to a method for recording the UP in the storage apparatus when the storage apparatus is rented. Then, the user pays for episodes 1 to 3 there.

If the user desires to watch contents of an episode 4 or later episodes after watching rented contents at a home, processing for validating the UP described above in the exemplary embodiment of the present invention can be performed, so that the user can watch contents of an episode 4 or later episodes without visiting the shop again to rent. The clerk acquires the history within the storage apparatus and bills an additional fee to the user when the storage apparatus is returned.

Also, the content rental service using an automatic rental machine can be provided by applying the exemplary embodiment of the present invention, which will be described below.

FIG. 13 is a view illustrating an example of a screen that the user selects content desired to watch in an automatic rental machine to which the exemplary embodiment of the present invention is applied.

The content rental service using the automatic rental machine may be provided such that the automatic rental machine which stores a storage apparatus in which ten latest movie contents encrypted and the invalidated UP corresponding to the corresponding content are recorded is installed in, for example, a station or a convenience store.

Before renting content from the automatic rental machine, the user inserts a membership card, a credit card or a pre-paid card having a membership function into the automatic rental machine, and so a user authentication is performed. If the user authentication is successful, a content selecting screen shown in FIG. 13 is displayed on a display of the rental machine. The user selects desired content. The automatic rental machine and the storage apparatus stored in the automatic rental machine perform processing described with reference to FIG. 8, so that the UP corresponding to content selected by the user among UPs recorded in the storage apparatus is validated.

The storage apparatus that the UP corresponding to selected content is validated is outputted from the automatic rental machine. The automatic rental machine bills a fee corresponding to the validated UP to a user information holder acquired during the user authentication when UP renewal processing is performed. A billing method or a billing timing is not described above, but, for example, an automatic payment of a credit card, or a payment of a pre-paid card or a cash payment is possible.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed:

1. A storage apparatus which is able to communicate with an external apparatus, comprising:
    a storing area for storing encrypted content having content which is encrypted;
    a storing area for storing a key for decrypting the encrypted content;
    a storing area for storing as 1 bit information state information of a correspondence key corresponding 1:1 to a recording address of a usage pass of each of the encrypted contents having the key for decrypting the encrypted content and content usage condition and indicating whether or not the usage pass of each of the encrypted contents is valid;
    means for receiving authentication information from a first external apparatus which reproduces content;
    means for executing authentication processing based on the authentication information received from the first external apparatus;
    means for receiving location information of the key for decrypting the encrypted content from the first external apparatus;
    means for receiving a command for changing state information of the key for decrypting the encrypted content from the first external apparatus;
    means for executing the command for changing state information of the key for decrypting the encrypted content received under a certain condition;
    means for recording a history that the command is executed in a storing area installed therein;
    means for receiving a command for outputting the history to a corresponding external apparatus from the first external apparatus or a second external apparatus; and
    means for executing the command for outputting the history when the command for outputting the history is received from the first or second external apparatus.

2. The storage apparatus according to claim 1, wherein state information of the key for decrypting the encrypted content is represented by 1 bit with respect to one key and represents whether the key is valid or invalid.

3. The storage apparatus according to claim 1, wherein the certain condition is a case where authentication information received from the external apparatus is identical to authentication information stored in a corresponding storage apparatus.

4. A method for validating encrypted content of a storage apparatus which is able to communicate with an external apparatus and stores encrypted content, the storage apparatus including:
    a storing area for storing encrypted content having content which is encrypted;
    a storing area for storing a key for decrypting the encrypted content;
    a storing area for storing as 1 bit information state information of a correspondence key corresponding 1:1 to a recording address of a usage pass of each of the encrypted contents containing a key for decrypting the encrypted content and content usage condition and indicating whether or not the usage pass of each of the encrypted contents is valid;
the method comprising the steps of:
    a step of receiving authentication information from a first external apparatus which reproduces content;
    a step of executing authentication processing based on the authentication information received from the first external apparatus;

a step of receiving location information of the key for decrypting the encrypted content from the first external apparatus;

a step of receiving a command for changing state information of the key for decrypting the encrypted content from the first external apparatus;

a step of executing the command for changing state information of the key for decrypting the encrypted content received under a certain condition;

a step of recording a history that the command is executed in a storing area installed therein;

a step of receiving a command for outputting the history to a corresponding external apparatus from the first external apparatus or a second external apparatus; and a step of executing a command for outputting the history when the command for outputting the history is received from the first or second external apparatus, at the step of receiving the authentication information, receiving authentication information and location information of the key for decrypting the encrypted content transmitted from an external apparatus;

at the step of executing the authentication processing, validating a state of a key corresponding to location information of the key for decrypting encrypted content designated by the external apparatus in the storage apparatus if the authentication information is identical to authentication information stored in the storage apparatus;

at the step of recording a history that the command is executed in a storing area therein, recording a history that the method for executing the command for changing the state information of the key validates the key state in the storing area installed in the storage apparatus; and when the first or second external apparatus requests to output the history stored in the storage apparatus, outputting the history stored therein to the external apparatus which requests the history stored therein.

5. The method according to claim 4, wherein state information of the key for decrypting the encrypted content is represented by 1 bit with respect to one key and represents whether the key is valid or invalid.

6. A terminal apparatus which is able to communicate with a storage apparatus and reproduces encrypted content in the storage apparatus, comprising:

means for acquiring location information of a key for decrypting encrypted content recorded in the storage apparatus from the storage apparatus;

means for acquiring an electronic certificate stored in the storage apparatus from the storage apparatus;

means for verifying the acquired electronic certificate;

means for extracting service specific information contained in the electronic certificate from the electronic certificate;

means for prompting a user to input authentication information and information of content desired to watch if a value of service specific information is a predetermined certain value;

means for transmitting information inputted by the user and location information of the key for decrypting encrypted content corresponding to information of content desired to watch which is inputted by the user;

means for transmitting to the storage apparatus a command for validating a state of the key for decrypting encrypted content corresponding to the information of content desired to watch; and means for acquiring history information stored in the storage apparatus, wherein the storage apparatus and the terminal apparatus perform a mutual authentication in which the terminal apparatus verifies by using a root public key stored therein a device class public key certificate transmitted from the storage apparatus after the storage apparatus is coupled to the terminal apparatus;

generates a challenge key by using a random number generator if a verification of the certificate is successful;

encrypts the challenge key by anelliptic cryptography by using the device class public key acquired by the verification of the certificate;

combines a device class public key certificate stored therein with the encrypted data;

and transmits the combined data to the storage apparatus whereas the storage apparatus divides the combined data received from the terminal device into the device class public key certificate of the terminal apparatus and the encrypted data;

and verifies the device class public key certificate by using a root public key stored therein, wherein after the mutual authentication is performed between the storage apparatus and the terminal apparatus, a content ID, a user ID, a user PW and a management number are inputted by a user, so that the terminal apparatus specifies an address information in which a usage pass corresponding to the inputted content ID is recorded and a sector number continued thereto based on information corresponding a content to a usage pass acquired from the storage apparatus;

encrypts the user ID, the user PW, the management number, the ID of content desired to watch, the address information and the sector number continued thereto by using a provisional key shared with the storage apparatus during the mutual authentication so as to transmit the encrypted data to the storage apparatus; makes the storage apparatus decrypt the encrypted data received from the terminal apparatus by using the provisional key shared with the terminal apparatus during the mutual authentication and compare the acquired user ID, user PW and management number with a user ID, a user PW and a management number stored in the storage apparatus so as to make the storage apparatus determine whether they are identical or not; and issues a command to validate the usage pass to the storage apparatus so as to make the storage apparatus execute processing to validate the usage pass if it is confirmed in the storage apparatus that decryption processing of the encrypted data and a comparison of the user IDs, the user PWs and the management numbers transmitted from the terminal apparatus are successful.

* * * * *